(12) United States Patent
Wieland et al.

(10) Patent No.: US 10,046,994 B2
(45) Date of Patent: Aug. 14, 2018

(54) METHOD FOR TREATING LIQUIDS WITH GASEOUS OZONE

(71) Applicant: XYLEM IP HOLDINGS LLC, White Plains, NY (US)

(72) Inventors: Arne Wieland, Minden (DE); Martin Kampmann, Frankfurt am Main (DE); Jens Scheideler, Schloss-Holte (DE); Achim Ried, Bad Oeynhausen (DE)

(73) Assignee: XYLEM IP HOLDINGS LLC, White Plains, NY (US)

( * ) Notice: Subject to any disclaimer, the term of this patent is extended or adjusted under 35 U.S.C. 154(b) by 0 days.

(21) Appl. No.: 15/417,990

(22) Filed: Jan. 27, 2017

(65) Prior Publication Data

US 2017/0183247 A1 Jun. 29, 2017

Related U.S. Application Data

(62) Division of application No. 13/818,467, filed as application No. PCT/EP2011/004210 on Aug. 22, 2011, now abandoned.

(30) Foreign Application Priority Data

Aug. 25, 2010 (DE) .................. 10 2010 035 519

(51) Int. Cl.
*C02F 1/00* (2006.01)
*C02F 1/48* (2006.01)
(Continued)

(52) U.S. Cl.
CPC .................. *C02F 1/78* (2013.01); *C02F 1/32* (2013.01); *C02F 1/722* (2013.01); *C02F 2103/343* (2013.01); *C02F 2303/04* (2013.01)

(58) Field of Classification Search
CPC . B01D 15/00; B01D 21/02; B01F 5/06; B01J 20/00; C02F 1/00; C02F 1/24;
(Continued)

(56) References Cited

U.S. PATENT DOCUMENTS

| 5,578,205 A | 11/1996 | Martin |
| 6,024,882 A | 2/2000 | McNeilly et al. |

(Continued)

FOREIGN PATENT DOCUMENTS

| CN | 101549900 A | 10/2009 |
| EP | 0561458 A1 | 9/1993 |

(Continued)

OTHER PUBLICATIONS

International Preliminary Report on Patentability dated Feb. 26, 2013, corresponding to International Application No. PCT/EP2011/004210, filed Aug. 22, 2011, 7 pages.

(Continued)

*Primary Examiner* — Hayden Brewster
(74) *Attorney, Agent, or Firm* — RatnerPrestia

(57) ABSTRACT

A method for treating contaminated liquids in a flow by ozone, wherein the ozone is fed in gas form into the flow at one point and then is mixed into the flow in stages by mixers following one another in the flow direction, so that an absolute quantity of introduced ozone increases after each mixer until a feed efficiency of more than 95 percent is reached.

13 Claims, 2 Drawing Sheets

(51) Int. Cl.
- *C02F 1/72* (2006.01)
- *C02F 1/76* (2006.01)
- *C02F 1/78* (2006.01)
- *C02F 1/32* (2006.01)
- *B01D 15/00* (2006.01)
- *B01J 20/00* (2006.01)
- *C02F 9/00* (2006.01)
- *C02F 103/34* (2006.01)

(58) Field of Classification Search
CPC ......... C02F 1/32; C02F 1/325; C02F 1/4672; C02F 1/4676; C02F 1/48; C02F 1/50; C02F 1/5281; C02F 1/688; C02F 1/72; C02F 1/722; C02F 1/725; C02F 1/74; C02F 1/76; C02F 1/78; C02F 1/782; C02F 3/1242; C02F 9/00; C02F 9/005
USPC ....... 210/198.1, 199, 748, 748.16, 758, 759, 210/760; 422/24
See application file for complete search history.

(56) References Cited

U.S. PATENT DOCUMENTS

| | | |
|---|---|---|
| 6,164,813 A | 12/2000 | Wang |
| 6,235,207 B1 * | 5/2001 | Conrad ................... C02F 1/78 210/742 |
| 7,595,003 B2 | 9/2009 | Maddox |
| 2003/0173276 A1 * | 9/2003 | Arnaud ............. B01D 21/2433 210/143 |
| 2004/0099608 A1 | 5/2004 | Leffler |
| 2006/0006122 A1 | 1/2006 | Burns et al. |
| 2006/0021951 A1 | 2/2006 | van Leeuwen et al. |
| 2008/0290045 A1 | 11/2008 | Robinson et al. |
| 2010/0292844 A1 * | 11/2010 | Wolf ........................ C02F 9/00 700/271 |

FOREIGN PATENT DOCUMENTS

| | | |
|---|---|---|
| EP | 1021377 B1 | 1/2003 |
| KR | 100802889 B1 | 2/2008 |

OTHER PUBLICATIONS

International Search Report dated Dec. 22, 2011, corresponding to International Application No. PCT/EP2011/004210, filed Aug. 22, 2011, 10 pages.

Final Office Action for U.S. Appl. No. 13/818,467, dated Jul. 28, 2016, 18 pages.

Non Final Office Action for U.S. Appl. No. 13/818,467, dated Jan. 29, 2016, 22 pages.

Entire patent prosecution history of U.S. Appl. No. 13/818,467, filed Jun. 27, 2013, entitled, "Device and Method for Treating Liquids by Means of Ozone".

* cited by examiner

METHOD FOR TREATING LIQUIDS WITH GASEOUS OZONE

CROSS-REFERENCE TO RELATED APPLICATIONS

This U.S. patent application is a divisional patent application of U.S. patent application Ser. No. 13/818,467, filed Feb. 22, 2013, which is a U.S. National Phase Patent Application of PCT International Patent Application Number PCT/EP2011/004210, filed Aug. 22, 2011, which claims priority benefit of German Patent No. DE 10 2010 035 519.4, filed Aug. 25, 2010, each of which is incorporated herein by reference in its entirety.

FIELD OF THE INVENTION

The present invention relates to a device for treating liquids by means of ozone, and to a method for treating liquids by means of ozone.

BACKGROUND OF THE INVENTION

Increasingly high requirements are placed on the quality of drinking water and service water. Contaminations by organic substances are increasingly being recognised as harmful to health, thereby making removal necessary. On the other hand, such substances are more and more frequently reaching the groundwater and surface water. One example of this is the increasing concentration of pharmaceutical residues in surface water.

Such contaminations are reduced using various means. One of these means is the oxidation of organic contaminations. This is particularly effectively achieved in the so-called "Advanced Oxidation Process" (AOP), in which ozone and hydrogen peroxide are introduced into the contaminated water and then react with one another to form a hydroxyl radical. This hydroxyl radical is a highly effective oxidising agent.

From the document U.S. Pat. No. 5,578,205, which is incorporated by reference, it is known to add firstly hydrogen peroxide to a flow of contaminated water and then to add ozone downstream in a single step. In this way, impurities in the treated water are at least partially broken down. The document EP 0 561 458 A1, which is incorporated by reference, describes a method for treating contaminated water in which firstly oxygen and ozone are fed at high pressure into the water in a reaction container. Hydrogen peroxide can then be added later in a separate reaction container downstream of the ozone feed point. The document EP 1 021 377 B1, which is incorporated by reference, describes a method for treating contaminated water in which ozone and hydrogen peroxide are fed directly into the main water flow and both substances are then simultaneously fully dissolved and distributed in the water in a highly effective mixing device within a few seconds. This is intended to prevent the formation of bromate. Bromate is suspected of having a carcinogenic effect. There is therefore an upper limit for the permissible bromate content in drinking water. Said method is intended to minimise the formation of bromate in the event that bromide ions exist in the water to be treated.

The document U.S. Pat. No. 7,595,003 B2, which is incorporated by reference, describes a method for disinfecting ballast water on board ships by means of ozone. In order to avoid high bromate concentrations, the concentrations of bromide and bromate are monitored and the injection of ozone is controlled according thereto.

SUMMARY OF THE INVENTION

The present invention relates to further minimising the formation of bromate in water which contains bromide ions and which is treated with ozone.

Because the feed device feeds ozone into the water flow at one point, and because a plurality of mixers for mixing the ozone into the water are provided downstream of the feed point, wherein the mixers are arranged at a distance from one another so that a reaction zone forms between the mixers, the ozone is mixed into the water flow in stages so that the absolute quantity of the ozone introduced into the water increases with each mixing stage. This prevents the occurrence of excessively high local dissolved ozone concentrations which would lead to a formation of bromate.

It may be provided that the mixers are in each case static mixers without any movable parts.

The dimensioning of the feed device preferably provides that the distance between the mixers and the flow rate of the water are selected such that a volume of water takes between 0.5 seconds and approximately 30 seconds, but preferably between 1 and 10 seconds, between leaving one mixer and entering the next mixer.

In one preferred embodiment, the feed system is arranged in a pipe which comprises a plurality of straight sub-sections and U-shaped connecting pieces arranged therebetween. In connection with the description below, this mode of construction will be referred to as a "pipe that is bent in a loop-like manner" for the sake of simplicity.

For AOP processes, it may be provided that a feeding-in of hydrogen peroxide or other reagents is provided upstream of the ozone feed point.

Finally, the device may also be configured such that an irradiation with electromagnetic waves, in particular with UV radiation, is provided between two mixers or after the last mixer.

BRIEF DESCRIPTION OF THE DRAWINGS

Examples of exemplary embodiments of the present invention will be described in more detail below with reference to the drawing, in which.

DETAILED DESCRIPTION OF EXEMPLARY EMBODIMENTS OF THE INVENTION

Figure 1:
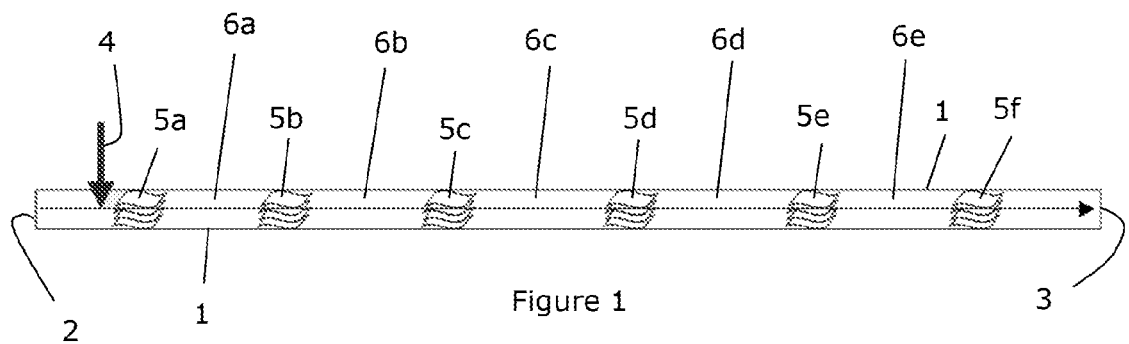
FIG. 1: shows a schematic view of a feed system according to aspects of the invention in a horizontal or vertical linear configuration.

FIG. 1 schematically shows a feed system for feeding gaseous ozone into the flow of contaminated water. The feed system is arranged in a pipe 1 between an inlet 2 and an outlet 3. In a known manner, the pipe 1 is made from a material that is not attacked by oxidising agents (e.g. stainless steel or PVC). The installations located upstream of the inlet 2 and downstream of the outlet 3 are known from the prior art. These are the usual installations of a waterworks or of a water treatment plant. The feed system shown in FIG. 1 may be arranged in a horizontal and vertical orientation.

In FIG. 1, the flow direction runs from left to right, that is to say from the inlet 2 to the outlet 3. Provided immediately adjacent to the inlet 2 is a schematically illustrated ozone feed point 4 which is configured as a nozzle lance, injection point or as a ceramic inlet element and is arranged in the main flow of the water.

A first mixer 5a is arranged downstream of the ozone feed point 4. This is preferably a so-called static mixer which works without any movable components and brings the ozone, which is initially in gas form, into intimate contact with the flowing water solely on the basis of turbulence formation and thereby dissolves a portion of the gaseous ozone. The mixer 5a is designed in such a way that the introduced ozone is not completely dissolved but rather initially only a proportion of approximately 20 to 30% is dissolved. Therefore 70 to 80% of the gaseous ozone remains undissolved in the main flow of the water to be treated in the pipe 1. A first reaction zone 6a is provided downstream of the first mixer 5a. The water containing the partially dissolved ozone flows substantially undisturbed into this reaction zone for a time between 0.5 seconds and approximately 30 seconds, but preferably between 1 and 10 seconds, through the pipe 1. It then reaches a downstream second mixer 5b which once again dissolves approximately 20% of the gaseous ozone. Located downstream of the second mixer 5b is a second reaction zone 6b into which in turn approximately 50% of the gaseous ozone is transported with the main flow, while the dissolved ozone can react with the contaminations present in the water. The residence time in the second reaction zone 6b is once again between 0.5 seconds and approximately 30 seconds, but preferably between 1 and 10 seconds. Provided downstream of the reaction zone 6b is a third mixer 5c, which operates like the first mixer 5a and the second mixer 5b. The third mixer 5c is followed by a third reaction zone 6c then by a fourth mixer 5d and a fourth reaction zone 6d, a fifth mixer 5e and a fifth reaction zone 6e and a last, sixth mixer 5f which is arranged immediately upstream of the outlet 3.

In this exemplary embodiment, the mixers 5a to 5f and the reaction zones 6a to 6e are of identical design and size. Therefore, proceeding from the inlet 2, the full quantity of ozone is firstly added in gas form at the ozone feed point 4. As the main flow passes, the mixers 5a to 5f each mix the gaseous ozone into the main flow such that it partially dissolves. In the subsequent reaction zone 6a to 6e, the dissolved ozone can then react with the contaminations that can be oxidised.

In a known manner, the mixing elements are made from a material that is not attacked by oxidising agents (e.g. stainless steel or PVC). The number of mixing elements can be adapted to the specific task, but the number should not be less than two mixing elements.

The design and arrangement of the mixers and of the reaction zones means that the concentration of dissolved ozone increases only slightly from reaction zone to reaction zone. This gentle introduction of the ozone prevents local high concentrations of dissolved ozone and thus prevents the formation of bromate.

Upstream of the inlet 2, another substance suitable for breaking down harmful substances may also be added to the main flow of the water to be treated, for example hydrogen peroxide. Here, too, the effect is that the ozone is still mostly in gas form after the first mixer and will not react with these substances. In the case of adding hydrogen peroxide, this means that the full possible quantity of hydroxyl radicals is not formed immediately but rather the absolute quantity of hydroxyl radicals will increase upon passing through each further reaction zone.

It is also possible that the hydrogen peroxide is introduced into the water flow not upstream of the ozone feed point but rather after the first reaction zone 6a. The mixing of the hydrogen peroxide then takes place via the mixer 5b. By virtue of this mode of operation, the advantage is obtained that substances which react directly with ozone have already been broken down in the first reaction zone 6a. This takes place on account of the high local ozone concentration occurring after the first mixer 5a due to the partial mixing-in of gaseous ozone. The reaction zone 6a can be dimensioned such that all the substances which react directly with ozone are broken down before the mixer 5b, and the quantity of dissolved ozone can no longer be detected. Substances which react with hydroxyl radicals will then be broken down in the subsequent reaction zones.

The progress of the dissolved ozone concentration over time and the sequence of the reaction zones in which the ozone or the hydroxyl radicals react with the oxidisable substances contained in the water means that particularly low rates of production of undesired oxidation by-products, particularly of bromate, are achieved. In systems in which ozone is already completely dissolved in a first, highly effective mixer, more bromate is formed.

Figure 2:
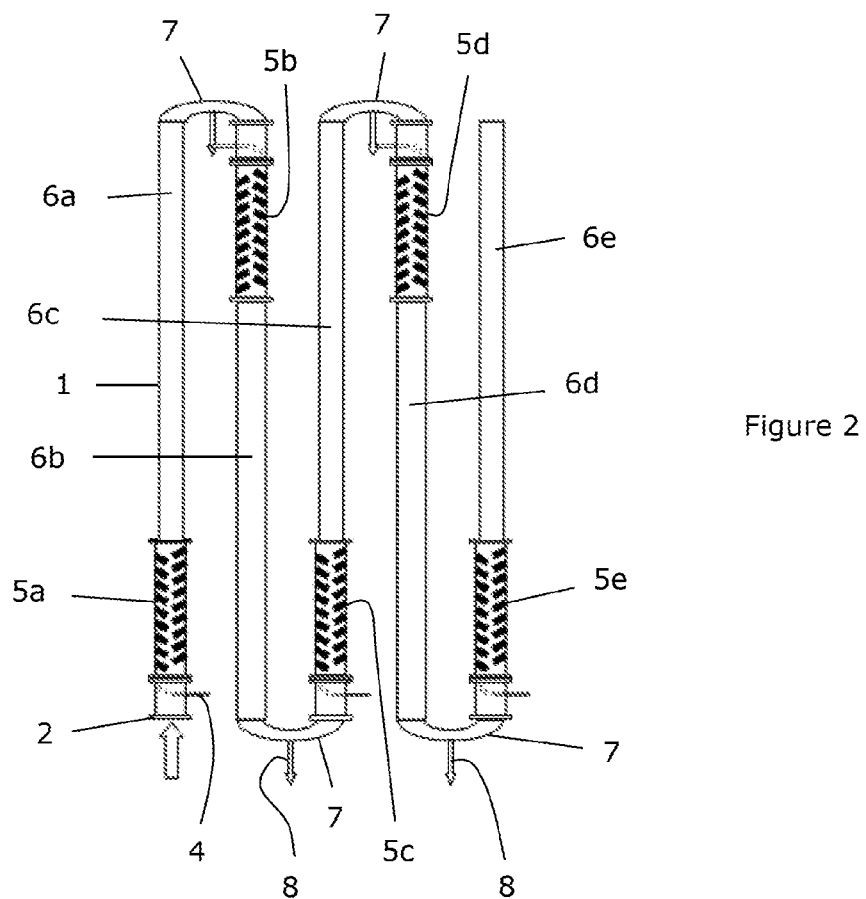
FIG. 2: shows a space-saving design of a feed system according to aspects of the invention in a loop arrangement.

Another exemplary embodiment of the present invention is illustrated in FIG. 2. Here, the pipe 1 is bent between the inlet 2 and the outlet 3. The ozone feed device 4 is provided after the inlet. This is followed in the flow direction by the first mixer 5a and the first reaction zone 6a. A pipe elbow 7 deflects the main flow through 180° into the opposite direction. The main flow then enters the second mixer 5b and the second reaction zone 6b. These are followed once again by a pipe elbow 7 which deflects into a direction parallel to the original main flow. The third mixer 5c and the third reaction zone 6c follow. These are followed once again by a pipe elbow 7 which leads to the fourth mixer 5d and the fourth reaction zone 6d. Finally provided is a last pipe elbow 7 which leads to the fifth mixer 5e and the fifth reaction zone 6e. The latter finally opens into the outlet 3. For the water treatment, approximately the same structure and the same mode of action are obtained as in the example of embodiment in FIG. 1. Due to the bending, however, a so-called loop reactor is formed which is arranged in a much more compact manner. The loop reaction shown in FIG. 2 can be arranged horizontally or vertically. The portion of the pipe 1 in which the first mixer 5a, the first reaction zone 6a and the ozone feed point 4 are arranged may be oriented either with the main flow direction upwards, so that the gaseous ozone rises with the main flow direction due to the upward propulsion of the gas bubbles and is moved in co-current. If the first portion runs with the main flow direction downwards, the main flow direction entrains the ozone gas bubbles but the direction of propulsion is then counter to the main flow direction, so that the migration rate of the ozone bubbles is reduced and the residence time of the gaseous ozone in this region is increased.

Figure 3:
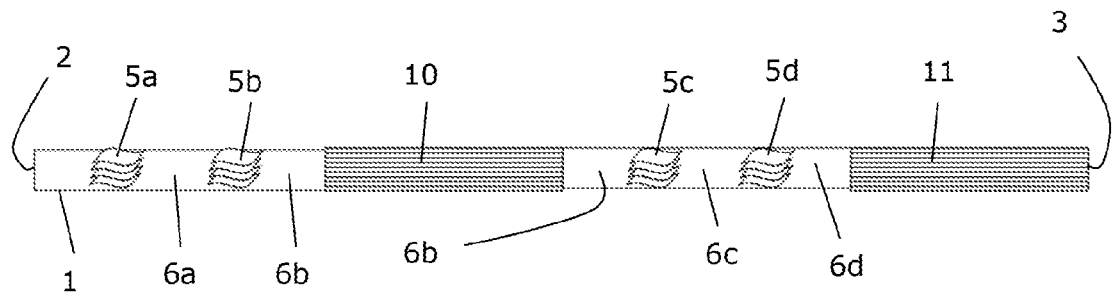
FIG. 3: shows a feed system with a schematically illustrated irradiation unit.

FIG. 3 shows another exemplary embodiment in which a first irradiation region 10 and a second irradiation region 11 are provided in addition to the oxidation described above. The irradiation regions 10 and 11 serve for introducing electromagnetic radiation into the main flow of the water to be treated, namely in the region between the mixers 5b and 5c, which represents the second reaction zone 6b, and in the region between the mixer 5d and the outlet 3. This region represents the fourth reaction zone 6d in this exemplary embodiment. It is also possible to install an irradiation region after the last reaction zone.

A UV reactor, as known for example from the disinfection of drinking water, may be installed in the pipe 1 in each of the regions 10 and 11. Such a UV reactor comprises a stainless steel pipe which is installed in an existing pipeline by way of suitable flanges. One or more UV emitters are then arranged in the interior of the reactor, said emitters irradiating the flowing liquid with a defined dose of UV radiation. Mercury low-pressure emitters or mercury medium-pressure emitters are preferably used.

By combining the UV radiation with the oxidation process, it is possible that harmful substances which are known to be photo-sensitive (for example NDMA) can be eliminated in parallel with the ozone+$H_2O_2$ combination. Hydroxyl radicals can be generated by irradiating dissolved ozone with UV rays. This results in the advantage that, in addition to the substances which react directly with ozone or which are deemed to be photo-sensitive, it is also possible to reduce substances which can only be reduced by hydroxyl radicals. Hydroxyl radicals can likewise be generated by irradiating dissolved hydrogen peroxide with UV rays. This results in the advantage that, in addition to the substances which are deemed to be photo-sensitive, it is also possible to reduce substances which can only be reduced by hydroxyl radicals. However, this combination is valid only for low specific substance concentrations. It is also possible that the ozone stage, the hydrogen peroxide dosing and the UV irradiation are used in parallel in a process. Overall, by virtue of these arrangements, the advantage is obtained that it is possible during operation of the system to react to varying substances and substance concentrations by the different possible combinations. A more efficient process is provided as a result.

For the three examples of embodiments that have been described, a measurement and adjustment system is provided for controlling the system. This superordinate control system includes adjusting the required ozone quantity and the required quantity of hydrogen peroxide and measuring the concentrations of ozone in the gas phase and water phase as well as the concentration of hydrogen peroxide in the water phase. The required ozone quantity is adjusted by adapting the ozone concentration in the product gas and adapting the product gas flow. The required ozone quantity is calculated by defining the required ozone dose on the control unit and the volume flow of the water to be treated. The required quantity of hydrogen peroxide is likewise calculated by defining the hydrogen peroxide dose on the control unit and the volume flow of the water to be treated. By virtue of this manner of control, the required quantities of ozone and hydrogen peroxide can be adapted by the control unit of the system to the quantity of water to be treated.

The quantity of ozone dissolved in the water is determined by a suitable measuring device. The measurement may take place either directly after each mixer 5a to 5f and each reaction zone 6a to 6e or overall at the end of the mixing and reaction section. Determining the quantity of dissolved ozone has the advantage that, by virtue of this measurement, the required ozone quantity can be adapted to the actual ozone consumption. If the dissolved quantity of ozone should exceed a value to be defined, either the quantity of produced ozone can be reduced, the dose of hydrogen peroxide can be increased or the UV radiation can be increased or switched on. The measurement at the end of the mixing and reaction section serves to ensure that there is no longer any dissolved ozone in the process. If the value to be defined is exceeded, the required ozone quantity can also be required via the control unit.

The hydrogen peroxide concentration can be determined after it has been mixed into the main flow and serves to check the actual hydrogen peroxide dose. The hydrogen peroxide concentration can also be determined at the end of the mixing and reaction section in order to be able to ascertain the efficiency of the process.

By virtue of the control unit and the determination of the parameters mentioned above, the system can react autonomously to any change in the water quantity and in the composition of the water to be treated. As a result, an efficient process is provided in which only the quantities of ozone and hydrogen peroxide that are actually required are introduced. The operating costs can be reduced as a result.

Figure 4:
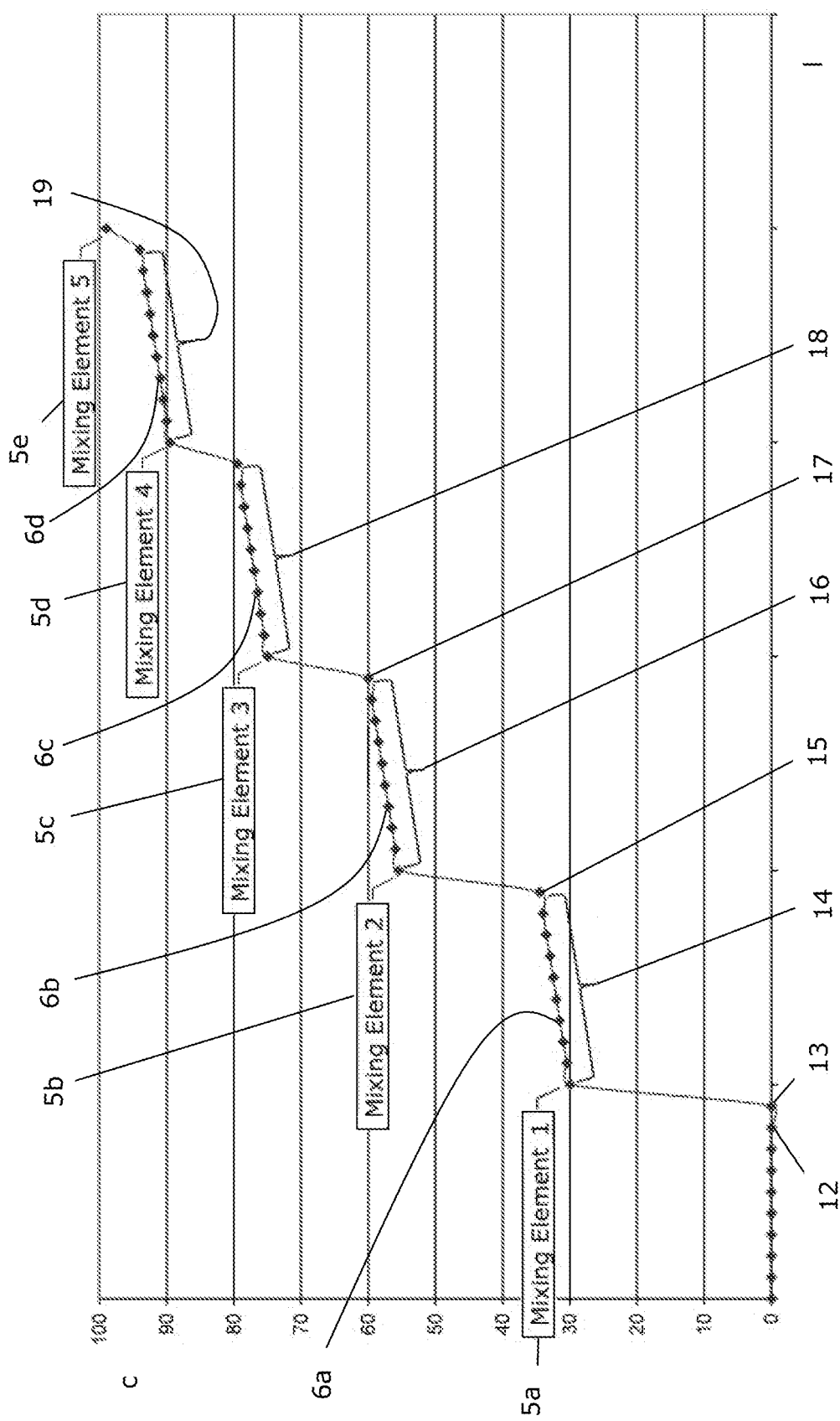
FIG. 4: shows the curve of the feed efficiency of the ozone over the length of the feed system from FIG. 1.

FIG. 4 shows, in a schematic diagram, how the ozone feed efficiency develops over the length l of the pipe 1 from FIG. 2. Proceeding from the length 0, which coincides with the inlet 2, the introduced quantity of ozone is initially 0. The introduction of the full quantity of gaseous ozone at the location of the feed point 4 is denoted by the measurement point 12. Prior to reaching the first mixer 5a, barely any ozone is transferred into the water phase. After passing the first mixer 5a, approximately 30% of the gaseous ozone is transferred into the water phase, and in the subsequent reaction zone 6a, which is denoted by the region 14 in the diagram, the value increases to approximately 35% because gaseous ozone dissolves in water over time even without the influence of mixing elements. Within the reaction zone 6a, the transferred ozone can react with the oxidisable substances contained in the water so that, prior to entering the second mixing element 5b, most of the introduced ozone has reacted. After passing the mixer 5b, the proportion of the ozone effectively introduced into the water rises to 55% and this increases to 60% in the subsequent reaction zone 6b. Within the reaction zone 6b, again most of the introduced ozone reacts with the substances contained in the water. After passing the mixer 5c, the proportion of transferred ozone rises to 75% and this increases to approximately 80% when passing the reaction zone 18. After passing the mixing element 5d and the reaction zone 6d, the proportion of effectively introduced ozone is approximately 95%. Finally, upon passing through the fifth mixer 5e, the quantity of effectively introduced ozone reaches 100%. This means that, in the fifth mixer 5e, the ozone added to the main flow as gaseous ozone at the ozone feed point 4 has been fully transferred into the main flow of the water and has reacted.

It can be seen that the quantity of ozone available for the reaction with the oxidisable substances that are likewise dissolved in the water is only between 30 and 35% in the first reaction zone 6a and hence there is no increased surplus of ozone. The formation of undesired substances such as bromate is in this way kept low. The ozone feed system using just one feed point 4 remains simple and does not require any complicated adjustment as is necessary for example when there are several feed points.

LISTING OF ITEM NUMBERS 1. pipe
2. inlet
3. outlet
4. ozone feed point
5a. mixing element
5b. mixing element
5c. mixing element
5d. mixing element 5e. mixing element
6a. reaction zone
6b. reaction zone
6c. reaction zone
6d. reaction zone
7. pipe elbow
8. outlet
10. irradiation region
11. irradiation region
12. measurement point
13. measurement point
14. reaction zone 6a
15. measurement point
16. reaction zone 6b
17. measurement point
18. reaction zone 6c
C. feed efficiency
l. length

What is claimed is:

1. A method for treating contaminated liquids in a flow by feeding a quantity of gaseous ozone into the flow at only one point and then gradually mixing the gaseous ozone into the flow in a plurality of mixing stages by means of mixers within each mixing stage without feeding more ozone into the flow, including controlling with a control unit the quantity of gaseous ozone added based upon a measured quantity of dissolved ozone at one or more locations downstream of one or more of the mixing stages, wherein the mixing stages follow one another in the flow direction and are separated by reaction zones, so that an absolute quantity of ozone cumulatively dissolved increases after each mixing stage until more than 95 percent of the quantity of gaseous ozone has cumulatively dissolved into the flow, while maintaining local dissolved ozone concentration in each reaction zone and mixing stage at or below a level that limits or prevents formation of undesired oxidation by-products from oxidizable substances contained in the liquid, wherein the local dissolved ozone concentration dissolved by a first mixing stage is in a range of 20% to 30% of the quantity of gaseous ozone, as controlled by the control unit.

2. The method according to claim 1, wherein the flow is a water flow and ozone is fed into the water flow at just one point.

3. The method according to claim 1, wherein a distance between the mixers and the flow rate of the liquid are selected such that a residence time for a volume of liquid in a reaction zone between leaving one mixer and entering the next mixer is between 0.5 seconds and 30 seconds.

4. The method according to claim 1 further comprising feeding-in hydrogen peroxide or other reagents into the liquid.

5. The method according to claim 4, wherein the feeding-in takes place upstream of an ozone feed point.

6. The method according to claim 4, wherein the feeding-in takes place downstream of an ozone feed point.

7. The method according to claim 6, wherein the feeding-in takes place in a reaction zone.

8. The method according to claim 1 further comprising irradiation with electromagnetic waves between at least two mixers or after a last mixer.

9. The method according to claim 1, wherein the contaminated liquid comprises water, the undesired oxidation by-products comprise bromates, and the oxidizable substances comprise bromide ions.

10. A method for treating contaminated liquids in a flow by feeding a quantity of gaseous ozone into the flow at only one point and then gradually mixing the gaseous ozone into the flow in a plurality of mixing stages by means of mixers within each mixing stage without feeding more ozone into the flow, including controlling with a control unit the quantity of gaseous ozone added based upon a measured quantity of dissolved ozone at one or more locations downstream of one or more of the mixing stages, wherein the mixing stages follow one another in the flow direction and are separated by reaction zones, so that an absolute quantity of ozone cumulatively dissolved increases after each mixing stage until more than 95 percent of the quantity of gaseous ozone has cumulatively dissolved into the flow, while maintaining local dissolved ozone concentration in each reaction zone and mixing stage at or below a level that limits or prevents formation of undesired oxidation by-products from oxidizable substances contained in the liquid, wherein the cumulative dissolved ozone concentration in a first reaction zone does not exceed 35% of the quantity of gaseous ozone, as controlled by the control unit.

11. The method according to claim 1, wherein a majority of the local dissolved ozone at a beginning of each reaction zone is consumed by reaction in each reaction zone before a subsequent mixing stage, as controlled by the control unit.

12. The method according to claim 1, comprising measuring the quantity of dissolved ozone after each mixing stage and after each reaction zone.

13. The method according to claim 1, comprising measuring the quantity of dissolved ozone after the plurality of mixing stages and a final reaction section.

* * * * *